US010739153B2

(12) United States Patent
DeLuca et al.

(10) Patent No.: US 10,739,153 B2
(45) Date of Patent: Aug. 11, 2020

(54) AUXILIARY NAVIGATIONAL ASSISTANCE

(71) Applicant: INTERNATIONAL BUSINESS MACHINES CORPORATION, Armonk, NY (US)

(72) Inventors: Lisa Seacat DeLuca, Baltimore, MD (US); Shelbee Eigenbrode, Thornton, CO (US); Dana Price, Surf City, NC (US); Aaron James Quirk, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 340 days.

(21) Appl. No.: 15/835,719

(22) Filed: Dec. 8, 2017

(65) Prior Publication Data

US 2019/0178659 A1 Jun. 13, 2019

(51) Int. Cl.
 *G01C 21/34* (2006.01)
 *G05D 1/02* (2020.01)
 *G01C 21/36* (2006.01)

(52) U.S. Cl.
 CPC ......... *G01C 21/3453* (2013.01); *G01C 21/34* (2013.01); *G01C 21/3492* (2013.01);
 (Continued)

(58) Field of Classification Search
 CPC .................................................. B64C 2201/12
 (Continued)

(56) References Cited

U.S. PATENT DOCUMENTS 6,975,923 B2 12/2005 Spriggs
8,606,511 B2 12/2013 Johnson
(Continued)

FOREIGN PATENT DOCUMENTS

CN 102322867 A 1/2012
WO WO 1987/001814 A1 3/1987

OTHER PUBLICATIONS

International Business Machines Corporation, "Real Time Route UYpdate in NAvigation Systems Using Vehicle and Driver Data", IPCOM000181701D, Apr. 9, 2009, (pp. 1-4).
(Continued)

*Primary Examiner* — Kenneth J Malkowski
(74) *Attorney, Agent, or Firm* — Michael A. Petrocelli, Esq.; Kevin P. Radigan, Esq.; Heslin Rothenberg Farley & Mesiti P.C.

(57) ABSTRACT

Auxiliary navigational assistance is provided by determining, by one or more processors, that a user traveling along a specified travel route with the assistance of a navigation system can use additional navigational assistance at a particular region of the specified travel route. Based on the determining, the one or more processors assign an unmanned vehicle to assist the user in traveling through the particular region along the specified travel route. Further, the one or more processors provide one or more auxiliary instructions to the user's navigation system directing the user to reference the unmanned vehicle within the particular region to assist the user in traveling through the particular region along the specified travel route. In operation, the particular region overlaps only a portion of the specified travel route.

20 Claims, 9 Drawing Sheets

(52) U.S. Cl.
CPC ..... *G01C 21/3605* (2013.01); *G01C 21/3626* (2013.01); *G05D 1/021* (2013.01)

(58) Field of Classification Search
USPC ........................................................ 701/420
See application file for complete search history.

(56) References Cited

U.S. PATENT DOCUMENTS

| | | | |
|---|---|---|---|
| 9,170,117 B1 | 10/2015 | Abuelsaad et al. | |
| 2016/0054143 A1* | 2/2016 | Boss ...................... | G01C 21/34 701/431 |
| 2016/0325835 A1* | 11/2016 | Boss ................ | G08G 1/096716 |
| 2017/0018193 A1* | 1/2017 | Gordon ................ | G08G 5/0069 |

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).

Anonymous, "System and Method for Temporal, Situational Navigational Routine Collaboration Among Autonomous Vehicles", IPCOM000230687D, Sep. 3, 2013 (pp. 1-3).

Anonymous, "Utilizing Wearable Technology for Improved Navigational Assistance", IPCOM000230850D, Sep. 15, 2013 (pp. 1-3).

Anonymous, "Method and System for Supplementing Driving Directions for People Navigating in Unfamiliar Areas", IPCOM000239609D, Nov. 19, 2014 (pp. 1-5).

Savant Automation, "Our AGV's Use Inertial Guidance Where Routes and System Operation can be Easily Changed Using a Proprietary Windows PC Program", www.agvsystems.com/agvs/, [Retrieved from Internet on Oct. 27, 2017], (pp. 1-3).

International Business Machines Corporation (IBM), "z/Architecture Principles of Operation," IBM® Publication No. 5A22-7832-10, Eleventh Edition, Mar. 2015, (pp. 1-1732).

International Business Machines Corporation (IBM), "Power ISA™ Version 2.07B," International Business Machines Corporation, Apr. 9, 2015, (pp. 1-1527).

* cited by examiner

US 10,739,153 B2

AUXILIARY NAVIGATIONAL ASSISTANCE

BACKGROUND

A navigation system is a system that aids a user in navigation. Navigation systems may be integrated on board a vehicle or vessel, or they could be provided as part of a mobile device. A Global Positioning System or GPS navigation device is one type of navigation system which uses groups of satellites that receive signal data from, for instance, a moving user, and uses the signal data to triangulate, and thus, position the traveling user. Such navigation systems are installed on a large share of mobile display devices today, and typically provide users with maps and routing information.

Following directions provided by a navigation system in an unfamiliar and/or heavily trafficked region may be difficult for many users, such that one or more users may find it difficult to navigate within or through such regions. Depending on the region, the person following the navigation route may not even speak the local language, making road signs difficult to follow.

Conventionally, a navigation system provides an indication of roads or paths available, and at each turn a particular road or path to be taken to arrive at the desired destination. The navigation system typically provides a shortest route between two locations, that is, between an origin location and a destination location, and generates the navigation route with turn-by-turn navigation directions and distances based on road numbers and/or names. As noted, in unfamiliar and/or heavily trafficked regions, a user may find it difficult to follow navigational route instructions constructed using this approach.

SUMMARY

Certain shortcomings of the prior art are overcome and additional advantages are provided, in one or more aspects, through the provision of a method of providing auxiliary navigational assistance. The method includes determining, by one or more processors, that a user traveling along a specified travel route with the assistance of a navigation system can use additional navigational assistance at a particular region of the specified travel route. Based on the determining, assigning, by the one or more processors, an unmanned vehicle to assist the user in traveling through the particular region along the specified travel route. Further, the method includes providing, by the one or more processors, one or more auxiliary instructions to the user's navigation system directing the user to reference the unmanned vehicle within the particular region to assist the user in traveling through the particular region along the specified travel route, where the particular region overlaps only a portion of the specified travel route.

Systems and computer program products relating to one or more aspects also described and claimed herein. Further, services relating to one or more aspects may also be described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
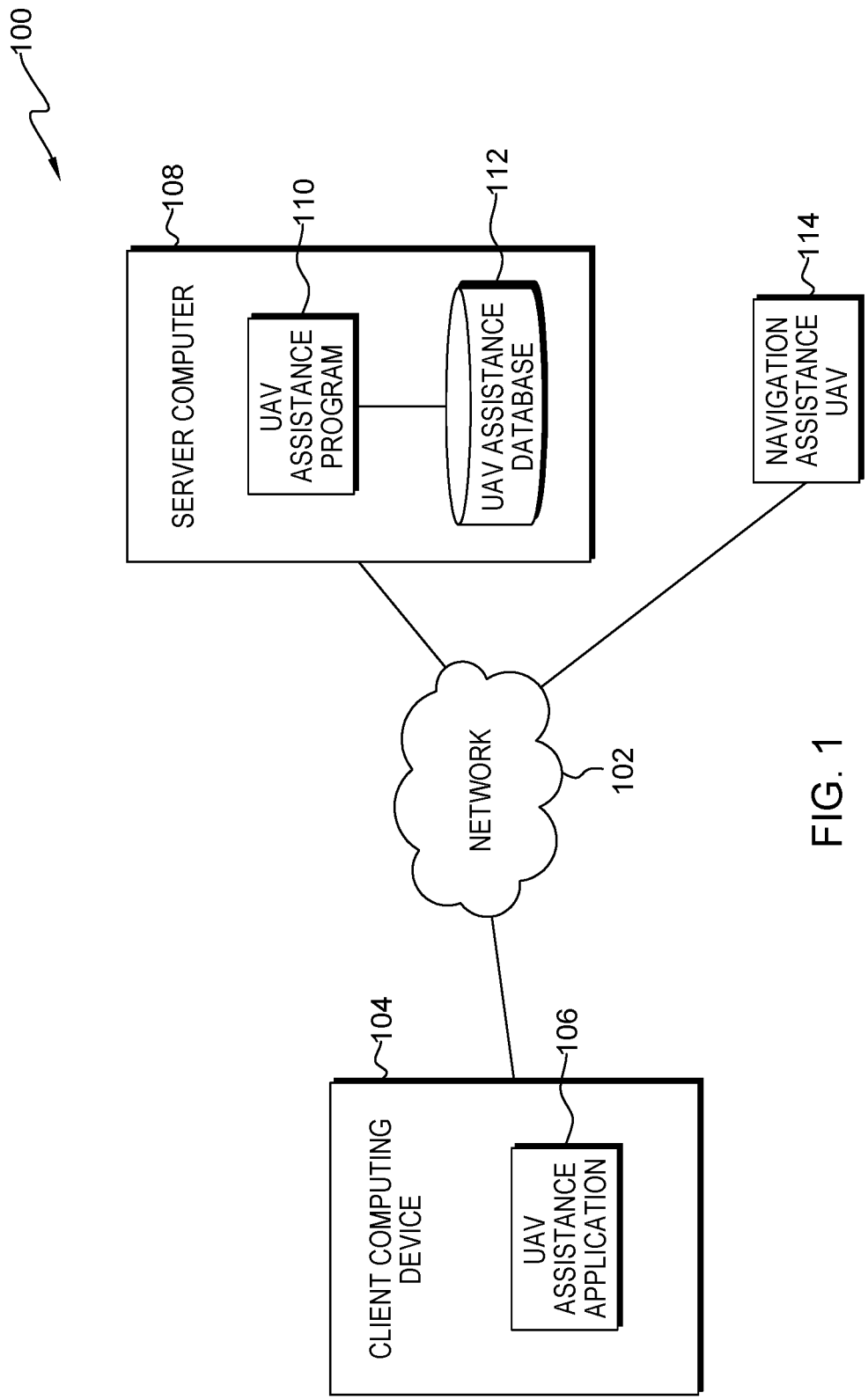
FIG. 1 is a block diagram illustrating a distributed processing environment implementing one or more embodiments of navigational assistance processing, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired by a particular application, for instance, to facilitate providing navigation assistance, including auxiliary navigational assistance such as disclosed herein.

The illustrative embodiments may be described using specific code, designs, architectures, protocols, layouts, schematics, or tools only as examples, and are not limiting to the illustrative embodiments. Furthermore, the illustrative embodiments are described in some instances using particular software, tools, and data processing environments only as example for clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

Route guidance and navigation is a growing industry. Many smartphones are capable of route navigation using mobile application software ("apps") that utilize GPS satellites. Typically, route navigation apps require a user to either listen to audible directions announced by the route navigation system, or to glance on to a screen that displays directions. If a user has hearing issues, listening to audible directions may be difficult. If a user is driving a vehicle while receiving navigation directions, glancing at a screen requires the user to momentarily look away from the road. This could be difficult for a user traveling along a specified travel route with the assistance of a navigational system where a region along the route is particularly complex, unfamiliar, heavily trafficked, etc.

In one or more aspects, described below with reference to FIGS. 1-4, are route guidance systems or navigation systems that provide guidance augmented with the use of an unmanned vehicle, such as an unmanned aerial vehicle (UAV), from origin to destination along the specified travel route. In one or more other aspects, described below with reference to FIGS. 5-6B, is selective, auxiliary navigational assistance where, for instance, an unmanned vehicle may be dispatched to a particular region along a user's specified travel route to assist the user through that region.

Referring initially to FIGS. 1-4, embodiments of the present invention recognize that route guidance systems may be augmented with the use of an unmanned vehicle, such as an unmanned aerial vehicle (UAV), that operates as a visual guide to a driver or a pedestrian. A user with hearing issues can follow a UAV without having to listen to directions. A driver following a UAV may be less distracted than when having to glance at a screen within the vehicle. Embodiments of the present invention also recognize that UAV guidance may be viable where GPS signals are not, for example in tunnels or in a metropolitan area densely populated with large buildings. Implementation of embodiments of the invention may take a variety of forms, and exemplary implementation details only are discussed herein.

FIG. 1 is a block diagram illustrating a distributed processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed processing environment 100 may include a client computing device 104, a server computer 108, and navigation assistance UAV 114 interconnected over network 102. Network 102 can be, for example, a telecommunications network, a local area network (LAN), a wide area network (WAN), such as the Internet, or a combination thereof, and can include wired, wireless, or fiber optic connections. Network 102 may include one or more wired and/or wireless networks that are capable of receiving and transmitting data, voice, and/or video signals, including multimedia signals that include voice, data, and video information.

Client computing device 104 may be a laptop computer, a tablet computer, a specialized computer server, a smart phone, or any programmable mobile electronic device capable of communicating with server computer 108 and navigation assistance UAV 114 via network 102 and with various components and devices within distributed processing environment 100. Client computing device 104 may be a wearable computer. Wearable computers are miniature electronic devices that may be worn by the bearer under, with or on top of clothing, as well as in glasses, hats, or other accessories. Wearable computers are especially useful for applications that require more complex computational support than just hardware coded logics. Client computing device 104 may be integrated into a user's vehicle. In general, client computing device 104 represents any programmable electronic device or combination of programmable electronic devices capable of executing machine readable program instructions and communicating with other computing devices via a network, such as network 102. Client computing device 104 includes UAV assistance application 106.

UAV assistance application 106 may be mobile application software that provides an interface between a user of client computing device 104 and both server computer 108 and navigation assistance UAV 114. Mobile application software, or an "app", is a computer program designed to run on smartphones, tablet computers and other mobile devices. UAV assistance application 106 enables, in one or more embodiments, a user of client computing device 104 to request and receive navigation assistance from server computer 108 and navigation assistance UAV 114.

Server computer 108 may be a management server, a web server, or any other electronic device or computing system capable of receiving and sending data. In other embodiments, server computer 108 may represent a server computing system utilizing multiple computers as a server system, such as in a cloud computing environment. In another embodiment, server computer 108 may be a laptop computer, a tablet computer, a netbook computer, a personal computer (PC), a desktop computer, a personal digital assistant (PDA), a smart phone, or any programmable electronic device capable of communicating with client computing device 104 and navigation assistance UAV 114 via network 102. In another embodiment, server computer 108 represents a computing system utilizing clustered computers and components to act as a single pool of seamless resources. Server computer 108 includes UAV assistance program 110 and UAV assistance database 112.

UAV assistance program 110 provides navigation and routing guidance to a user of UAV assistance application 106 by dispatching a navigation assistance UAV to the location of the user upon request. UAV assistance program 110 directs the navigation assistance UAV on a route to the user's requested destination such that the user can visually follow the navigation assistance UAV to the requested destination rather than listening to audible directions or having to view directions or a map on a screen. The user of UAV assistance program 110 may be a pedestrian, a bicyclist, a driver or rider in a vehicle, or any user of UAV assistance application 106 requiring navigation assistance and guidance. In one embodiment, UAV assistance program 110 resides on server computer 108. In another embodiment, UAV assistance program 110 may reside on navigation assistance UAV 114. UAV assistance program 110 is depicted and described in further detail with respect to FIG. 2 and FIG. 3.

UAV assistance database 112 resides on server computer 108. In another embodiment, UAV assistance database 112 may reside on client computing device 104, on navigation assistance UAV 114, or elsewhere in the environment. A database is an organized collection of data. UAV assistance database 112 can be implemented with any type of storage device capable of storing data that may be accessed and utilized by server computer 108, such as a database server, a hard disk drive, or a flash memory. In other embodiments, UAV assistance database 112 can represent multiple storage devices within server computer 108. UAV assistance database 112 stores maps and route information used by UAV assistance program 110. UAV assistance database 112 also stores a registry and a unique identifier for client computing device 104 and other client computing devices (not shown) in distributed data processing environment 100.

Navigation assistance UAV 114 is a UAV that receives direction from UAV assistance program 110 in order to provide visual navigation assistance to a user of UAV assistance application 106. Navigation assistance UAV 114 physically guides a user along a route to the user's destination. Navigation assistance UAV 114 may include a display, such as an LED panel, for displaying identification as well as directional instructions, such as directional arrows, distance to the next waypoint, speed, street names, etc. Navigation assistance UAV 114 may also include a laser for pointing to objects and locations, such as vehicles, street signs, and preferred highway lanes. In one embodiment, navigation assistance UAV 114 appears visually striking, for example, with unique painted patterns, so that a user can distinguish navigation assistance UAV 114 from other navigation assistance UAVs in the same area. In one embodiment, navigation assistance UAV 114 is one of many navigation assistance UAVs that may constitute a fleet of navigation assistance UAVs in distributed data processing environment 100 (not shown).

Figure 2:
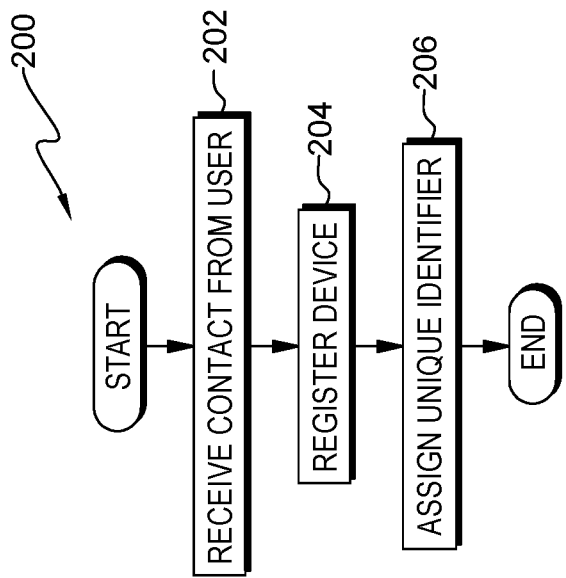
FIG. 2 depicts one embodiment of a UAV assistance process of a server computer within a distributed processing environment, such as depicted in FIG. 1, for initialization of navigation assistance, in accordance with one or more aspects of the present invention.

FIG. 2 depicts one embodiment of a process 200 implemented by a UAV assistance program 110, on server computer 108 within distributed processing environment 100 of FIG. 1, for initialization of navigation assistance, in accordance with an embodiment of the present invention.

UAV assistance program 110 receives contact from a user (step 202). A user downloads and launches UAV assistance application 106 and makes contact with UAV assistance program 110. In one embodiment, the user purchases a subscription to UAV assistance program 110 for a period of time or for a specified number of uses. In another embodiment, the user may purchase a onetime use contract in order to try UAV assistance program 110 before committing to a long-term subscription.

UAV assistance program 110 registers the user's device (step 204). UAV assistance program 110 registers the user's device, such as client computing device 104, as UAV assistance enabled, and stores the registry in UAV assistance database 112. A user may register more than one device. For example, if client computing device 104 is integrated into the user's vehicle, the user may register the vehicle as well as a smartphone so that the user can utilize UAV assistance program 110 while driving or while walking. In addition to registering the user's device, UAV assistance program 110 may query the user for preferences. For example, UAV assistance program 110 may query the user for a preferred distance and height to be maintained between navigation assistance UAV 114 and client computing device 104 while navigation assistance UAV 114 provides navigation guidance. In another example, UAV assistance program 110 may query the user regarding preferred navigation routes, such as shortest duration, shortest distance, or least number of turns.

UAV assistance program 110 assigns a unique identifier (step 206). UAV assistance program 110 assigns a unique identifier to client computing device 104 and stores the identifier in UAV assistance database 112. Assigning a unique identifier to client computing device 104 allows UAV assistance program 110 to locate and distinguish client computing device 104 from other client computing devices in distributed data processing environment 100. The unique identifier also allows UAV assistance program 110 to locate other client computing devices that may be heading to the same destination as client computing device 104.

Figure 3:
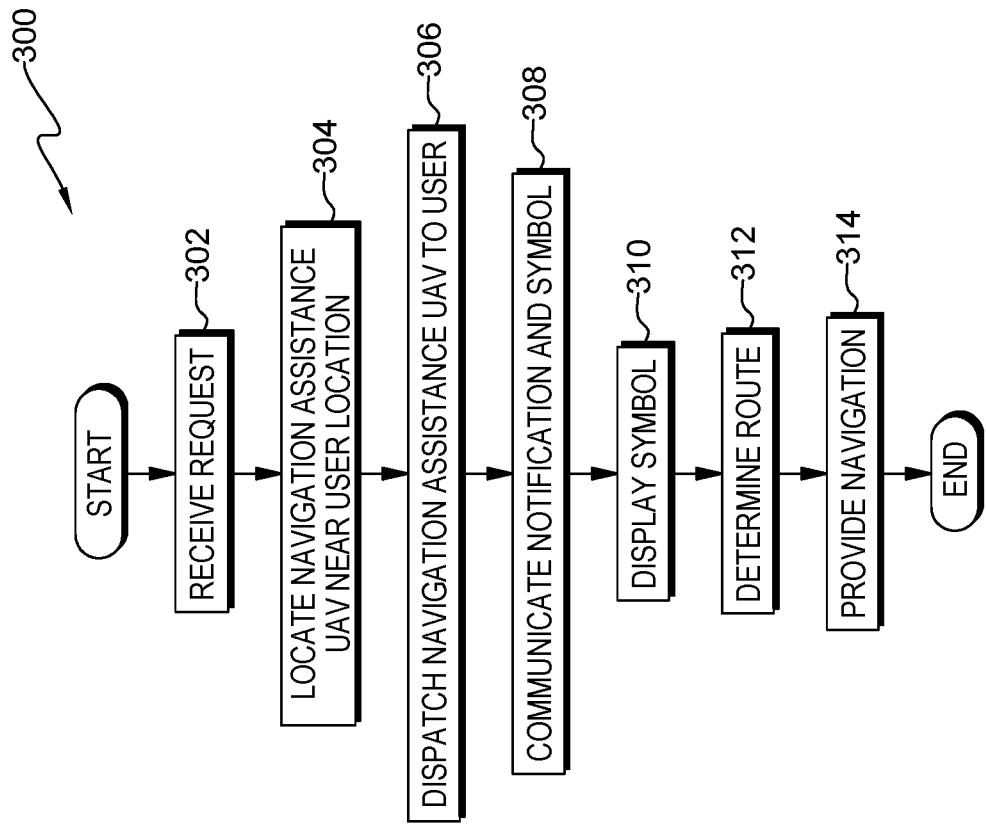
FIG. 3 depicts one embodiment of a UAV assistance process, on a server computer within a distributed processing environment such as depicted in FIG. 1, for providing navigation assistance, in accordance with one or more aspects of the present invention.

FIG. 3 depicts one embodiment of a process 300 of operational steps of UAV assistance program 110, on server computer 108 within distributed data processing environment 100 of FIG. 1, for navigation assistance.

UAV assistance program 110 receives a request (step 302). UAV assistance program 110 receives a request from a user of UAV assistance application 106 for navigation guidance to a destination. The request includes the unique identifier that UAV assistance program 110 assigned to client computing device 104 and stored in UAV assistance database 112 during the initialization process. UAV assistance program 110 also determines the location of client computing device 104 upon receiving the request. In one embodiment, UAV assistance program 110 determines the location of client computing device 104 by locating an embedded GPS device in client computing device 104 or by using other known triangulation or location tracking technologies. In another embodiment, UAV assistance program 110 may determine the location of client computing device 104 by querying the user to input a location via UAV assistance application 106. In a further embodiment, a user may request a location, via UAV assistance application 106, from which UAV assistance program 110 may begin. For example, a user may request that UAV assistance program 110 begin once the user arrives at an entrance to a highway. In another example, a user may request that UAV assistance program 110 begin at the location of a second registered device, such that a parent may request navigation assistance, via UAV assistance application 106 on a smart phone, for a child in a different location that is driving a vehicle with UAV assistance application 106 on an integrated client computing device.

UAV assistance program 110 locates a navigation assistance UAV near the user's location (step 304). In one embodiment, UAV assistance program 110 searches a fleet of navigation assistance UAVs and determines the navigation assistance UAV, such as navigation assistance UAV 114, that is close to client computing device 104, is available for navigation guidance, and has sufficient energy to complete the requested trip. In another embodiment, UAV assistance program 110 may locate two or more navigation assistance UAVs which, in sequence, can complete the trip, taking into account the amount of energy, or fuel, each navigation assistance UAV has and any restrictions on roaming areas for a given navigation assistance UAV. UAV assistance program 110 may determine the proximity of a navigation assistance UAV based on a distance threshold or radius. The distance threshold may depend on the user's location. For example, if a user is in a populated area such as a city, the distance threshold may be short, such as two blocks, versus if the user is in an unpopulated area where the threshold distance may be longer, such as two miles.

UAV assistance program 110 dispatches a navigation assistance UAV to the user (step 306). UAV assistance program 110 dispatches navigation assistance UAV 114 to the location of client computing device 104. UAV assistance program 110 communicates the location coordinates of client computing device 104 to navigation assistance UAV 114 that UAV assistance program 110 determined in step 302. Navigation assistance UAV 114 travels to a location where navigation assistance UAV 114 is visible to the user.

UAV assistance program 110 communicates a notification and a symbol to the user of UAV assistance application 106 (step 308). UAV assistance program 110 notifies the user via UAV assistance application 106 on client computing device 104 that navigation assistance UAV 114 is nearby. UAV assistance program 110 also communicates a symbol via UAV assistance application 106 on client computing device 104 which identifies navigation assistance UAV 114 as the navigation assistance UAV that is providing navigation assistance. The user may acknowledge the communication from UAV assistance program 110 via UAV assistance application 106. For example, if client computing device 104 is a smart phone, the user may acknowledge the communication from UAV assistance program 110 by pressing a button displayed on the screen of the smart phone.

UAV assistance program 110 displays the symbol (step 310). UAV assistance program 110 directs navigation assistance UAV 114 to display the previously communicated symbol to the user. If other navigation assistance UAVs are in the vicinity, the user of UAV assistance application 106 can locate navigation assistance UAV 114 by matching the symbol displayed by UAV assistance application 106 to the symbol displayed by navigation assistance UAV 114. In one embodiment, UAV assistance program 110 displays the symbol on an LED display panel on navigation assistance UAV 114. In another embodiment, UAV assistance program 110 displays the symbol by using an embedded laser in navigation assistance UAV 114 to project the symbol on a vehicle or object visible to the user. In one embodiment, UAV assistance program 110 receives acknowledgement or other confirmation from the user, via UAV assistance application 106, that navigation assistance UAV 114 is visible.

UAV assistance program 110 determines a route (step 312). Based on the requested destination, the user's location, and any previously provided user preferences, UAV assistance program 110 retrieves maps and route information from UAV assistance database 112 and determines the route that navigation assistance UAV 114 follows to lead the user to the requested destination. In one embodiment, UAV assistance program 110 determines the route using known GPS technology.

UAV assistance program 110 provides navigation (step 314). UAV assistance program 110 directs navigation assistance UAV 114 to travel ahead of and lead the user of UAV assistance application 106 to the requested destination. In one embodiment, UAV assistance program 110 provides navigation by directing navigation assistance UAV 114 to physically lead the user to the requested destination by flying in front of the user or the user's vehicle. UAV assistance program 110 directs navigation assistance UAV 114 to maintain optimal visual sight by evaluating the distance above the horizon with respect to the location of client computing device 104. For example, if the user is driving a vehicle, UAV assistance program 110 may ensure navigation assistance UAV 114 is not so high that the user cannot see it due to obstructions in the vehicle. Also, UAV assistance program 110 may ensure navigation assistance UAV 114 is not so high that the user has to lean forward and look up to see navigation assistance UAV 114. In addition, UAV assistance program 110 may ensure navigation assistance UAV 114 is high enough above common obstacles, for example, vehicles and traffic lights, but low enough for the user to see navigation assistance UAV 114 naturally. In an embodiment, navigation assistance UAV 114 includes a sensor with which UAV assistance program 110 can interact to determine the relative location of navigation assistance UAV 114 to client computing device 104 in order to maintain optimal visual sight. In one embodiment, navigation assistance UAV 114 informs the user on to which streets to turn by actually turning and flying down the streets. In another embodiment, navigation assistance UAV 114 may also indicate preparatory actions. For example, navigation assistance UAV 114 may indicate to the user to change lanes by flying overhead in the lane in which the user needs to be. In another embodiment, navigation assistance UAV 114 may indicate preparatory actions by displaying a directional arrow or words on the LED display panel.

In one embodiment, UAV assistance program 110 provides navigation by directing navigation assistance UAV 114 to project a laser image on a moving target in front of the user. For example, there may be instances when navigation assistance UAV 114 cannot maintain a visual lead for the user, such as when there are obstacles such as tunnels, street lights, power lines, overhead signs, bridges, etc. If navigation assistance UAV 114 cannot maintain a visual lead, then UAV assistance program 110 may direct navigation assistance UAV 114 to project a laser image, such as a red X, on an object in front of the user. For example, navigation assistance UAV 114 may project a laser image on the bumper or other non-disruptive surface of a vehicle in front of the user, and the user can follow the laser image until navigation assistance UAV 114 comes back into view. UAV assistance program 110 may query other users of UAV assistance application 106 in vehicles in the vicinity of client computing device 104 for vehicles with destinations similar to that of the user. If UAV assistance program 110 determines that one or more users of UAV assistance application 106 have route segments that overlap the user's route and are near the user, UAV assistance program 110 may direct navigation assistance UAV 114 to project a laser image on the bumper of a vehicle with the similar destination to act as a lead for the user. If the lead vehicle's route diverges from the user's route, UAV assistance program 110 directs navigation assistance UAV 114 to project a laser image on the bumper of another vehicle with the similar destination to act as a lead for the user. As an alternative, UAV assistance program 110 may direct navigation assistance UAV 114 to land on the lead vehicle and display directional messages on the LED panel for the user to follow. In another example, if the user's vehicle travels under a bridge, and the connection to the sky is disrupted, UAV assistance program 110 may direct navigation assistance UAV 114 to project words with the laser to indicate to the user that the visual connection will be lost for a number of seconds. Navigation assistance UAV 114 may display "Continue for 30 seconds . . . ", "Continue for 29 seconds . . . ", etc., at which point the laser may disappear for 29 seconds until the user's vehicle emerges from the bridge.

In another embodiment, UAV assistance program 110 provides navigation by directing navigation assistance UAV 114 to project a laser image on a stationary target that is visible to the user. For example, if there are no additional vehicles on the road on which the user is traveling, UAV assistance program 110 may direct navigation assistance UAV 114 to project a laser image onto the road in front of the user or onto a street sign, indicating a turn onto the targeted street is imminent. In another example, if the user is a pedestrian, UAV assistance program 110 may direct navigation assistance UAV 114 to project a laser image onto a solid color wall or fence or onto the sidewalk.

In yet another embodiment, if the user loses visual contact with navigation assistance UAV 114, UAV assistance program 110 may provide navigation by transmitting audible messages to client computing device 104 via UAV assistance application 106. If preferred, the user can continue to follow the audible guidance, or return to following the physical guidance once navigation assistance UAV 114 is in view.

In a further embodiment, UAV assistance program 110 may provide navigation by coordinating a lead vehicle for the user of UAV assistance application 106 instead of dispatching navigation assistance UAV 114. In the embodiment, UAV assistance program 110 determines which, if any, other vehicles in the vicinity of client computing device 104 are traveling to similar destinations via communicating with other client computing devices in vehicles that are using UAV assistance application 106. UAV assistance program 110 coordinates communication between a lead vehicle and the trailing vehicle containing client computing device 104 by directing the lead vehicle to display a symbol or image for the trailing vehicle to follow. For example, the lead vehicle may have a light integrated into the rear of the vehicle for the purpose of providing navigation guidance. If the lead vehicle completes the common route segment before the trailing vehicle arrives at the requested destination, UAV assistance program 110 determines and communicates with a second lead vehicle to continue the guidance for the trailing vehicle. UAV assistance program 110 continues this process until the user of client computing device 104 has arrived at the requested destination.

In an embodiment where UAV assistance program 110 may provide navigation by coordinating a lead vehicle for the user of UAV assistance application 106 instead of dispatching navigation assistance UAV 114, UAV assistance program 110 may interact with the rear view camera of the lead vehicle, such that the UAV assistance program 110 can monitor the trailing vehicle through the lead vehicle's rear view camera. For example, via the lead vehicle's rear view camera, UAV assistance program 110 can determine the space between the lead vehicle and the trailing vehicle. If the separation between the two vehicles exceeds a pre-defined value, then UAV assistance program 110 can alert the driver of the lead vehicle to slow down, via a message on the client computing device in the lead vehicle using UAV assistance application 106. In addition, through the lead vehicle's rear view camera, UAV assistance program 110 may note information about the trailing vehicle. For example, UAV assistance program 110 may detect the license plate of the trailing vehicle and compare it to license plates on a security list. The security list may reside on UAV assistance database 112 or UAV assistance program 110 may access the security list via network 102 from another computing device in distributed data processing environment 100 (not shown). If the license plate of the trailing vehicle is on a security list, UAV assistance program 110 may contact the appropriate authorities directly, or UAV assistance program 110 may alert the user to take action.

Figure 4:
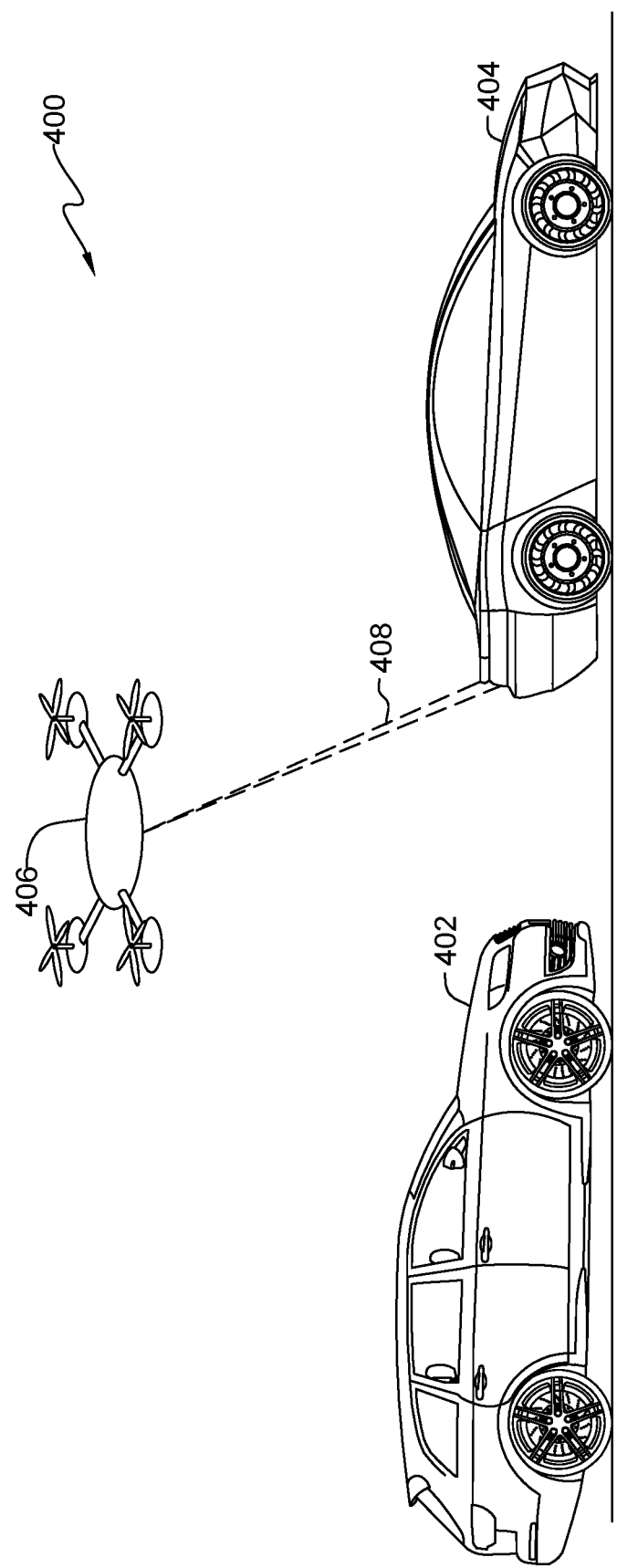
FIG. 4 illustrates an example operating environment of a UAV assistance process, operating on a server computer within the distributed processing environment of FIG. 1, in accordance with one or more aspects of the present invention.
Figure 5:
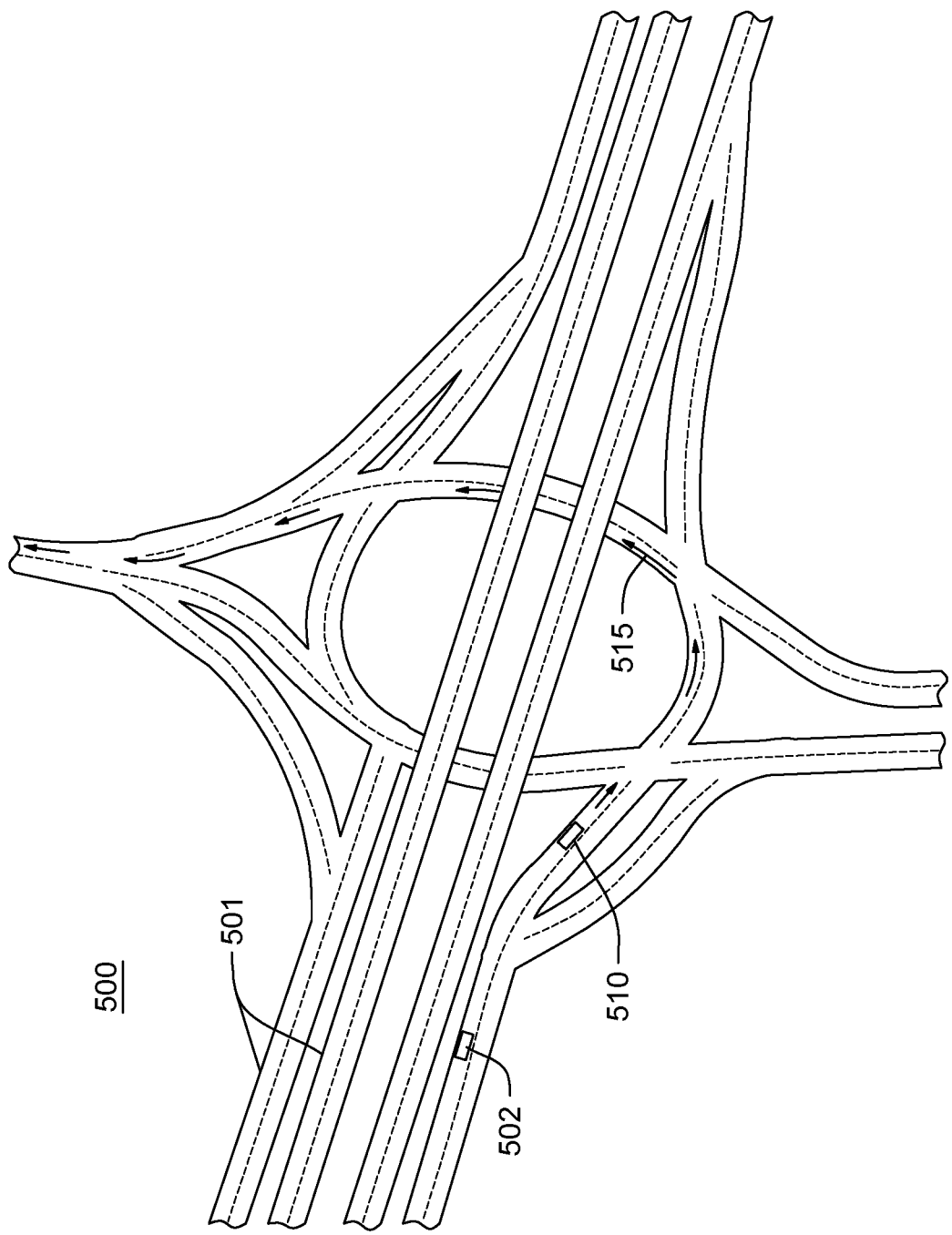
FIG. 5 depicts an example of a particular region where auxiliary navigational assistance may be advantageous to a user traveling along a specified travel route with the assistance of a navigation system, in accordance with one or more aspects of the present invention.

FIG. 4 illustrates one environment 400 depicting an example of an operating environment of UAV assistance program 110, operating on server computer 108 within distributed data processing environment 100 of FIG. 1, in accordance with an embodiment of the present invention.

In diagram 400, client computing device 104 (FIG. 1) may reside in car 402 and navigation assistance UAV 114 may be represented by navigation assistance UAV 406. The user of the client computing device may request navigation assistance via the UAV assistance application. In response to the request, the UAV assistance program dispatches navigation assistance UAV 406 to the user's location, per step 306 of FIG. 3. The UAV assistance program provides navigation, per step 314 of FIG. 3, by directing navigation assistance UAV 406 to lead the user, i.e. the driver of car 402, toward the requested destination. When the UAV assistance program determines that navigation assistance UAV 406 may need to fly out of the user's view to avoid an obstacle, the UAV assistance program may determine that car 404 is traveling to a similar destination. UAV assistance program may then direct navigation assistance UAV 406 to project an image on the bumper of car 404 using a laser 408. The driver of car 402 may follow the image projected on car 404 until navigation assistance UAV 406 comes back into view.

As noted above, in one or more other aspects disclosed herein with reference to FIGS. 5-6B are auxiliary navigational processes which may temporarily assist a user traveling along a specified travel route identified by the user's navigation system from an origin to a destination. The auxiliary navigational system provides the user with additional or auxiliary assistance within a particular region that overlaps, for instance, only a portion of the specified travel route. For instance, most drivers today have access to a navigation system, such as an on board GPS based navigation system to assist with directions. However, the directions provided by the system can be difficult to follow for a number of reasons, and particularly in certain geographies. By way of example, there may be known difficult travel areas or regions through which a specified travel route passes that even the best navigation application may have a difficult time describing to the driver. For example, there may be quick turns that require lane changes that are very easy to miss, particularly in heavy traffic or adverse weather conditions. Thus, provided herein (in one or more aspects) is a way to augment the conventional navigational application with real-world queues in order to simplify the directions for the user. As disclosed herein, the real-world queues may be based on providing, for instance, reference to one or more unmanned vehicles, such as an unmanned aerial vehicle or an unmanned ground vehicle, which are also collectively referred to herein as automated vehicles.

In particular, in one or more aspects, disclosed is a use of an automated or unmanned vehicle to serve as a pilot beacon for a driver through one or more difficult regions along a specified travel route. The unmanned vehicle may drive or fly in front of the user, and demonstrate the desired route as directed by the user's navigation system, i.e., the navigational application. As the user follows the unmanned vehicle, the navigational application may provide one or more directions based on the position of the unmanned vehicle. Also, should a first unmanned vehicle become inoperable or travel out of range, the user could be transferred to a different automated pilot vehicle for guidance within the particular region of interest.

Advantageously, by an approach such as disclosed herein, complicated navigational instructions may be simplified for a user following a specified travel route. Following an unmanned vehicle known to be traveling the proposed route provides the user with a physical directional beacon to improve the user's changes of success when traveling through the difficult region along the route. The automated or unmanned vehicle could be any type of unmanned vehicle visible to the user, including a driverless car, airborne drone, automated boat, etc. Value may be derived from this auxiliary navigational assistance in a number of ways. For instance, revenue may be generated for the optional use of an automated pilot vehicle in difficult traverse areas, and/or smarter transportation is achieved for potentially reduced fuel usage. Further, there is a potential for advertising generated revenue with the ability to advertise, for instance, on the automated or unmanned vehicle. Also, an unmanned vehicle, such as a UAV, could be marked for rental by companies, such as rental car companies, to assist their clients, particularly when traveling through particularly difficult regions along a travel route.

FIG. 5 illustrates an example of a difficult to travel region along a specified travel route. The example in this case is a highway interchange 500 where multiple roads 501 converge and a driver 502 is provided with a variety of decisions to be made when traveling along a specified travel route 515, which may be specified by the user's navigation system, such as a GPS based navigation system, also referred to herein as a navigational application. In such a case, the interchange is an example of a particular region along the specified travel route 515 where an unmanned vehicle 510 may be assigned to assist user 502 in traveling through the region along the specified travel route 515.

By way of further example, a process of providing auxiliary navigational assistance may include a user accessing a navigation application, such as via a GPS device or smartphone application, to enter a desired location or point of interest. The navigation system (or application) generates a specified travel route for the user to follow. Additionally, navigational assistance processing, which may be part of the navigation system or separate from the navigation system, for instance, a cloud based service, determines whether additional navigational assistance at a particular region of the specified travel route may be advantageous. For instance, the navigational assistance processing may evaluate: whether there are known frequently missed turns in a particular region; whether drivers often have to recalculate routes in a particular region; whether there is road construction in a particular region; whether visibility in a particular region due to weather or other conditions may be an issue; whether traffic at the time the user is passing through a particular region will be high; whether the user has traveled the route before, and if so, how often; how congested the traffic currently is, for instance a large number of vehicles may make it difficult to switch lanes quickly; whether there is an accident in a particular region, etc.

Based on determining that there is a particular region along the specified travel route that may be considered difficult, and thus, that the user may benefit from additional assistance, the auxiliary navigational processing may provide an unmanned vehicle to assist the user in traveling through the particular region along the specified travel route. This may include, for instance, dispatching an unmanned vehicle to the particular location. Further, one or more auxiliary instructions may be sent to the user's navigation system directing the user to reference the unmanned vehicle with a particular region to assist the user in traveling through the particular region along the specified travel route. Again, the particular region overlaps only a portion of the specified travel route. In one or more other implementations, where the auxiliary navigational assistance processing is part of the navigation system, the process may include simply providing the one or more auxiliary instructions for incorporation into the specified set of instructions identifying the specified travel route to the user.

For instance, the navigational system may display to the user that an automated vehicle may be useful at a given point, i.e., within a particular region. This may be an automated process where the determination is made without the user requesting the auxiliary navigational assistance, or could be responsive to the user requesting an unmanned or automated vehicle at a given location if they know the region that they are to travel through is particularly difficult or have experienced problems there in the past. The auxiliary navigational assistance processing may determine whether an unmanned vehicle is currently unavailable in the particular region, and if not, may dispatch an unmanned vehicle to the region before the user arrives at the region.

While traveling, the user approaches the particular region where the unmanned vehicle is to be used, and the auxiliary navigational assistance processing coordinates with the unmanned vehicle to position the vehicle, for instance, in front of the user so that the vehicle is visible to the user. In one or more embodiments, a cloud based service could be used to link the auxiliary navigational assistance processing with the unmanned vehicle, including sending desired coordinates, time, and speed to the unmanned vehicle. This information can be fine-tuned to control the unmanned vehicle's location as the user's vehicle approaches the particular region.

In one or more embodiments, the user's navigational application or system may announce to the user that the automated vehicle should be in view, and may identify the vehicle using a description. Note that the announcement may be audible and/or in text, such as on the user's navigational system display. For instance, the user may be instructed to follow the blue helicopter drone at your one o'clock. As another example, the user could be instructed to identify markings on an automated ground vehicle, such as follow the blue Honda civic with license plate xyz. Still further, the user could be instructed to follow the unmanned vehicle with a specified light pattern, such as follow the vehicle that is flashing the strobe light at you. The user may optionally acknowledge that they see the unmanned vehicle, such as by verbally stating "I see my pilot vehicle." The navigational system may modify one or more specified directions for the user along the specified travel route to, for instance, follow the unmanned vehicle within the particular region. For instance, the user's navigational application may announce directions in relation to the unmanned vehicle. By way of example, the user could be instructed to turn left on main street and make one or more lane changes to follow the user's unmanned vehicle through the particular region of the specified travel route. The navigational system processing may track the user's process to ensure that the user success-fully follows the unmanned vehicle. If the user loses contact with the vehicle, the same unmanned vehicle could be, for instance, slowed down by the service to allow the user to catch up, or could change direction or route to link back with the user. Alternatively, a new unmanned vehicle could be put into service to further assist the user from their current location within the particular region.

Note that the system disclosed herein could be combined with, for instance, environmental cameras within a particular region to, for instance, detect that a user may be struggling (e.g., staying for a long period within a roundabout, returning to the same intersection over and over, etc.) and the auxiliary navigational system processing could offer the service to the user. In one or more implementations, the unmanned vehicle could be a paid service for which a user may pay dependent on how long they need the assistance of the unmanned vehicle. For instance, the user could pay per mile, per turn, per time used, etc. until the auxiliary navigational system processing is no longer in need. If desired, the identity of the vehicle that the user is traveling in could be made anonymous for security.

Figure 6A:
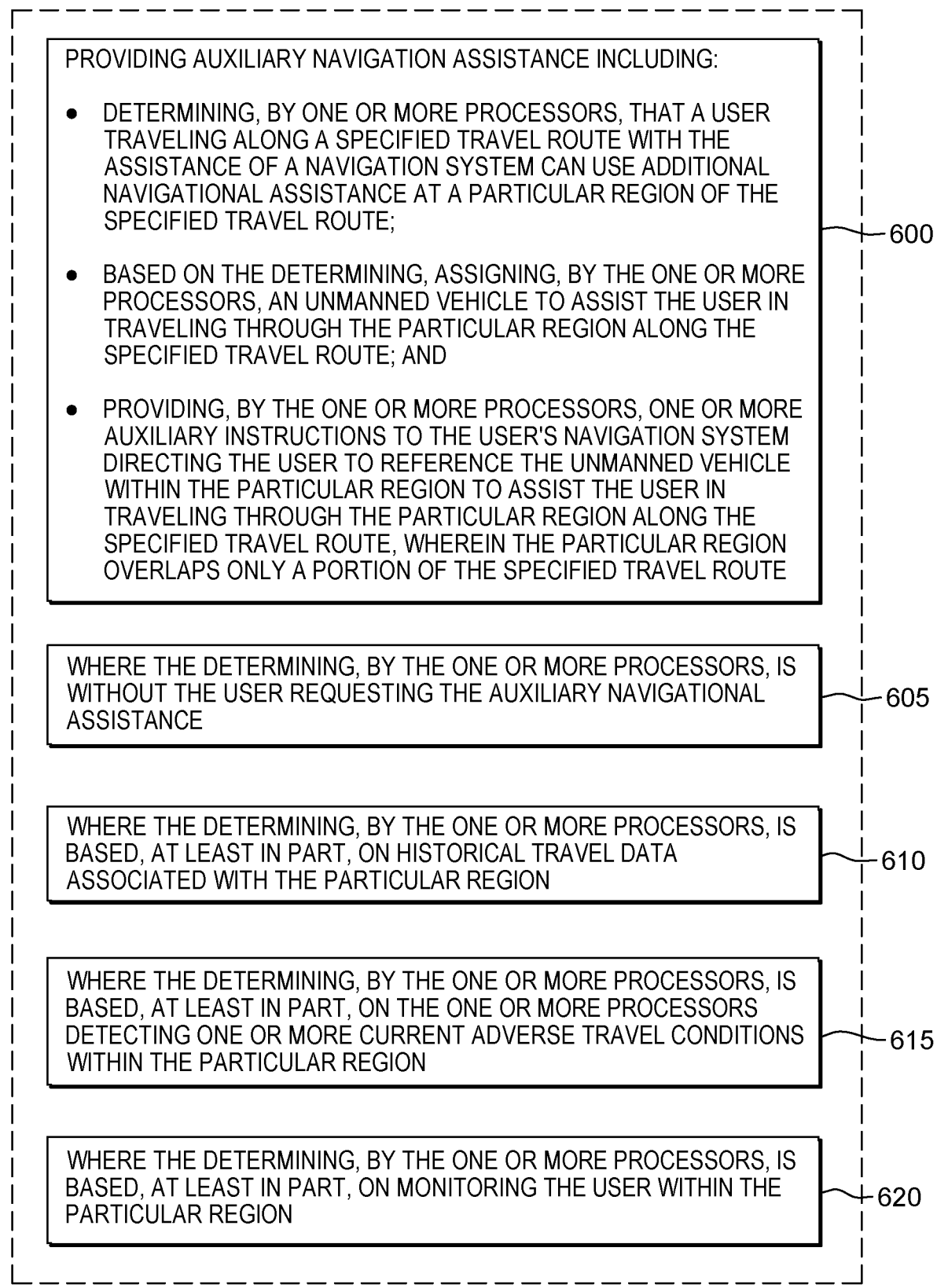
FIGS. 6A & 6B depict one embodiment of a process for providing auxiliary navigational assistance to a user traveling along a specified travel route with the assistance of a navigational system, in accordance with one or more aspects of the present invention.
Figure 6B:
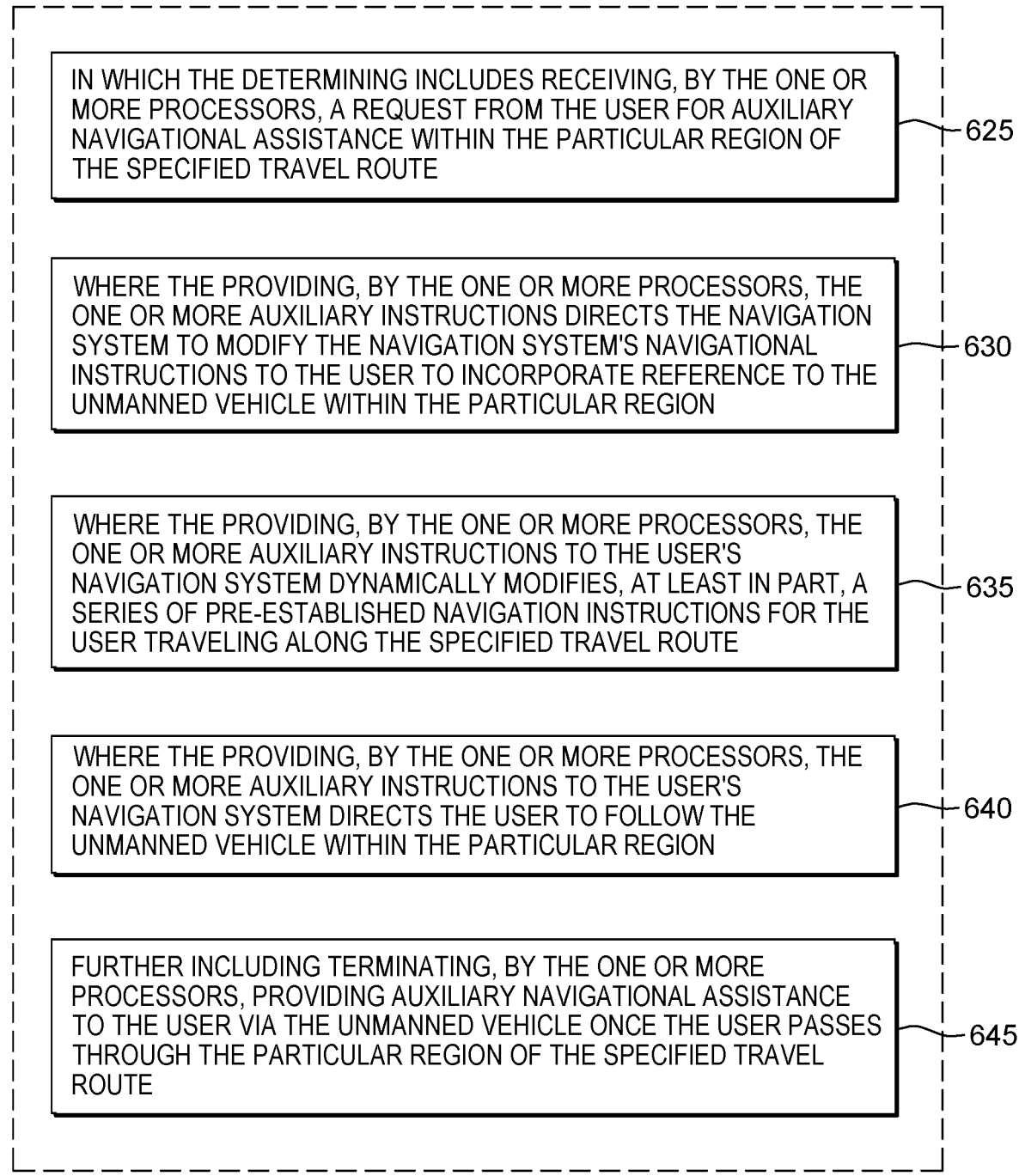

As an overview, FIGS. 6A & 6B depict methods of providing auxiliary navigational assistance to a user, in accordance with one or more aspects of the present invention. As illustrated, providing auxiliary navigational assistance to a user may include determining, by one or more processors, that a user traveling along a specified travel route with the assistance of a navigation system can use additional navigational assistance at a particular region of the specified travel route. Based on the determining, the one or more processors may assign an unmanned vehicle to assist the user in traveling through the particular region along the specified travel route. Further, the one or more processors may provide one or more auxiliary instructions to the user's navigational system directing the user to reference the unmanned vehicle within the particular region to assist the user in traveling through the particular region along the specified travel route. In use, the particular region overlaps only a portion of the specified travel route 600.

In one or more embodiments, the determining, by the one or more processors, is without the user requesting the auxiliary navigational assistance 605. In certain embodiments, the determining, by the one or more processors is based, at least in part, on historical travel data associated with the particular region 610. Further, in certain embodiments, the determining by the one or more processors is based, at least in part, on the one or more processors detecting one or more current adverse travel conditions within the particular region 615. In one or more implementations, the determining, by the one or more processors may be based, at least in part, on monitoring the user within the particular region 620. In certain embodiments, the determining may include receiving, by the one or more processors, a request from the user for auxiliary navigational assistance within the particular region of the specified travel route 625.

In one or more implementations, the providing, by the one or more processors, the one or more auxiliary instructions may direct the navigation system to modify the navigation system's navigational instructions to the user to incorporate reference to the unmanned vehicle within the particular region 630. For instance, the providing, by the one or more processors, the one or more auxiliary instructions to the user's navigation system may dynamically modify, at least in part, a series of pre-established navigational instructions for the user traveling along the specified travel route 635. In one or more embodiments, the providing by the one or more processors, the one or more auxiliary instructions to the user's navigational system may direct the user to follow the unmanned vehicle within the particular region 640.

In one or more implementations, the method may further include terminating, by the one or more processors, providing auxiliary navigational assistance to the user by the unmanned vehicle once the user passes through the particular region of the specified travel route 645.

By way of further example, a method and system are provided herein for providing navigational assistance to a user traveling, for instance, in a vehicle, along a specified travel route. The method may include: generating, by the navigation application, a route for a user to travel from a starting point to an ending point based on the user's location, for instance, in response to the user entering or requesting the route to a desired location; determining the user's location using a navigational application; determining, by the navigation application, when a guide vehicle can assist the user in navigating the route based on a plurality of factors such as described herein; dispatching, based on the determination of when the guide vehicle can assist the user, an automated vehicle to the vicinity of the user's vehicle; and coordinating and positioning the guide vehicle in front of the user for the user to follow through the particular region.

In one or more implementations, the method may further include determining one or more designated regions of the route where the unmanned vehicle can assist the user in traveling along the specified route, and dispatching the automated vehicle to the particular region to guide the user through the particular region. In one or more embodiments, the unmanned or automated vehicle could be a ground-based motor vehicle, an airborne motor vehicle, or a waterborne motor vehicle.

In one or more embodiments, the user may actually request the unmanned vehicle from the navigational application prior to reaching the particular region, and dispatching the unmanned vehicle to the vicinity of the user in the particular region may be based on the user's request.

As will be understood by those skilled in the art, the auxiliary navigational assistance disclosed herein can be used for any user traveling in any vehicle along a specified travel route, and may include, for instance, ground-based vehicles, or shipping vessels, airplanes, etc. For instance, the auxiliary navigational assistance processing disclosed herein could apply to using a drone for assisting a small aircraft through a particular region, or in the case of a boat or ship, a drone, or water-based vehicle, to guide the ship through a particularly difficult region.

Exemplary embodiments of a computing environment which could implement one or more aspects of the present invention are described below with reference to FIGS. 7-9.

Figure 7:
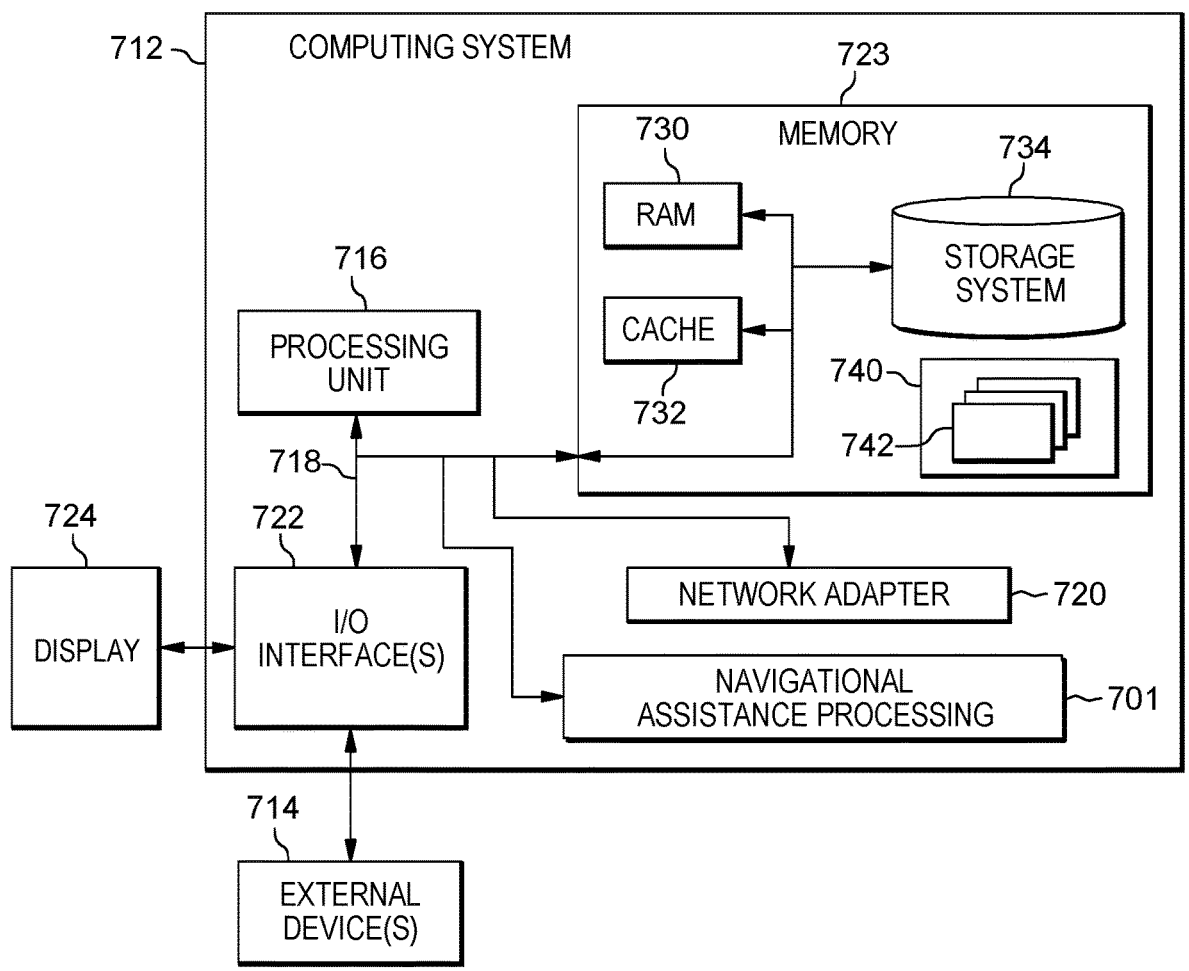
FIG. 7 depicts one embodiment of a computing system which may implement or facilitate implementing navigational assistance processing, in accordance with one or more aspects of the present invention.

By way of further example, FIG. 7 depicts one embodiment of a computing environment 700, which includes a computing system 712. Examples of well-known computing systems, environments, and/or configurations that may be suitable for use with computer system 712 include, but are not limited to, a server, a desktop computer, a work station, a mobile device, such as a wireless computer, a handheld or laptop computer or device, a mobile phone, a programmable consumer electronic device, a tablet, a personal digital assistant (PDA), or the like.

Computing system 712 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 7, computing system 712, is shown in the form of a general-purpose computing device. The components of computing system 712 may include, but are not limited to, one or more processors or processing units 716, a system memory 723, and a bus 718 that couples various system components including system memory 723 to processor 716.

In one embodiment, processor 716 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 712 may include a variety of computer system readable media. Such media may be any available media that is accessible by computing system 712, and it includes both volatile and non-volatile media, removable and non-removable media.

System memory 723 can include computer system readable media in the form of volatile memory, such as random access memory (RAM) 730 and/or cache memory 732. Computing system 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 718 by one or more data media interfaces. As described below, memory 723 may include at least one program product having a set (e.g., at least one) of program modules that are configured to carry out the functions of embodiments of the invention.

Program/utility 740, having a set (at least one) of program modules 742, may be stored in memory 723 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein. Alternatively, a separate navigational assistance processing system, module, logic, etc., 701 may be provided within computing environment 712.

Computing system 712 may also communicate with one or more external devices 714 such as, a keyboard, a pointing device, a display 724, etc.; one or more devices that enable a user to interact with computing system 712; and/or any devices (e.g., network card, modem, etc.) that enable computing system 712 to communicate with one or more other computing devices. Such communication can occur via Input/Output (I/O) interfaces 722. Still yet, computing system 712 can communicate with one or more networks such as a local area network (LAN), a general wide area network (WAN), and/or a public network (e.g., the Internet) via network adapter 720. As depicted, network adapter 720 communicates with the other components of computing system, 712, via bus 718. It should be understood that although not shown, other hardware and/or software components could be used in conjunction with computing system 712. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 7. Computing system 712 of FIG. 7 may be practiced in distributed cloud computing environments where tasks are performed by remote processing devices that are linked through a communications network. In a distributed cloud computing environment, program modules may be located in both local and remote computer system storage media including memory storage devices. Computing system 712 is capable of being implemented and/or performing any of the functionality set forth hereinabove.

Figure 8:
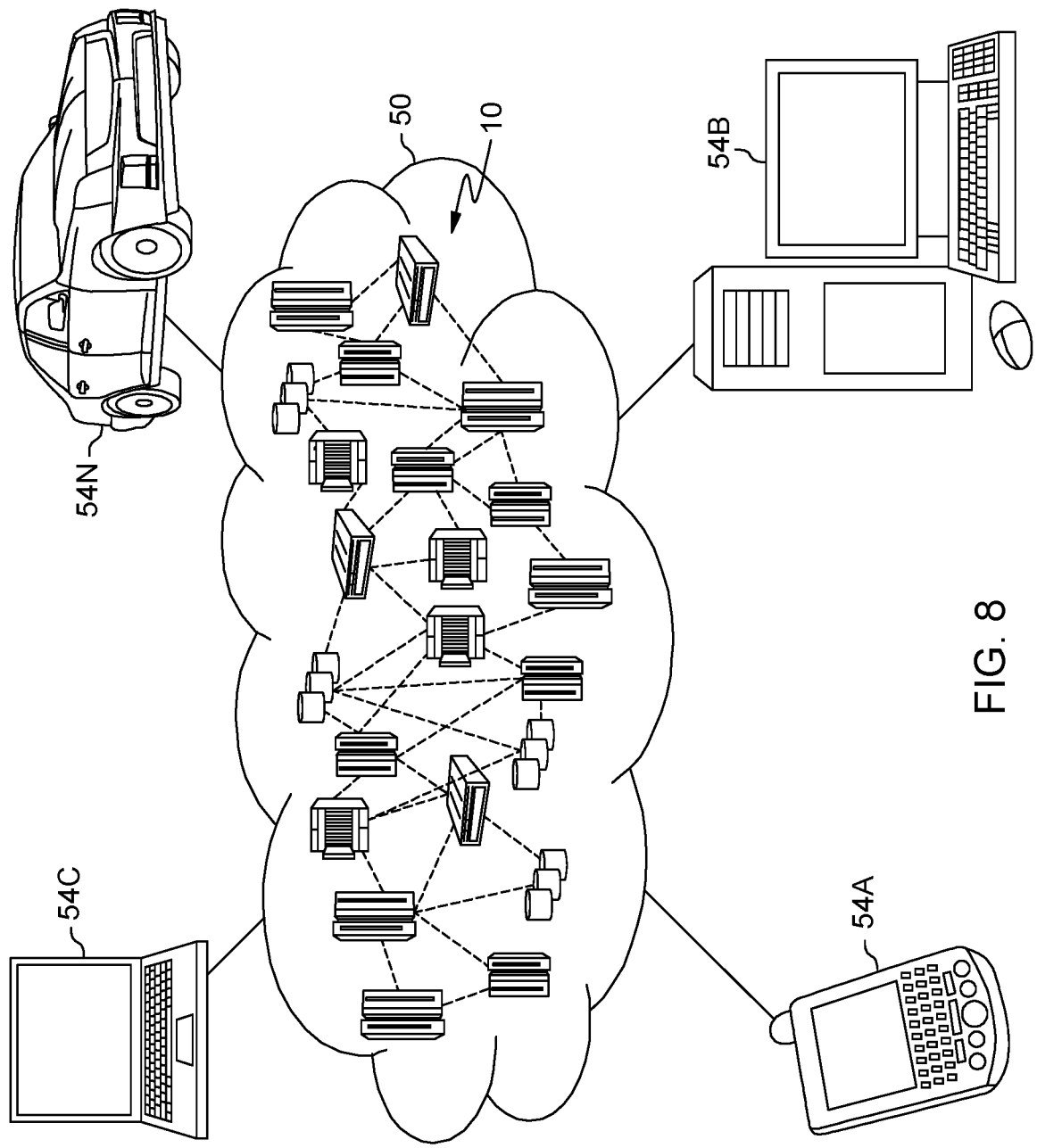
FIG. 8 depicts one embodiment of a cloud computing environment which may facilitate implementing, or be used in association with one or more aspects of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
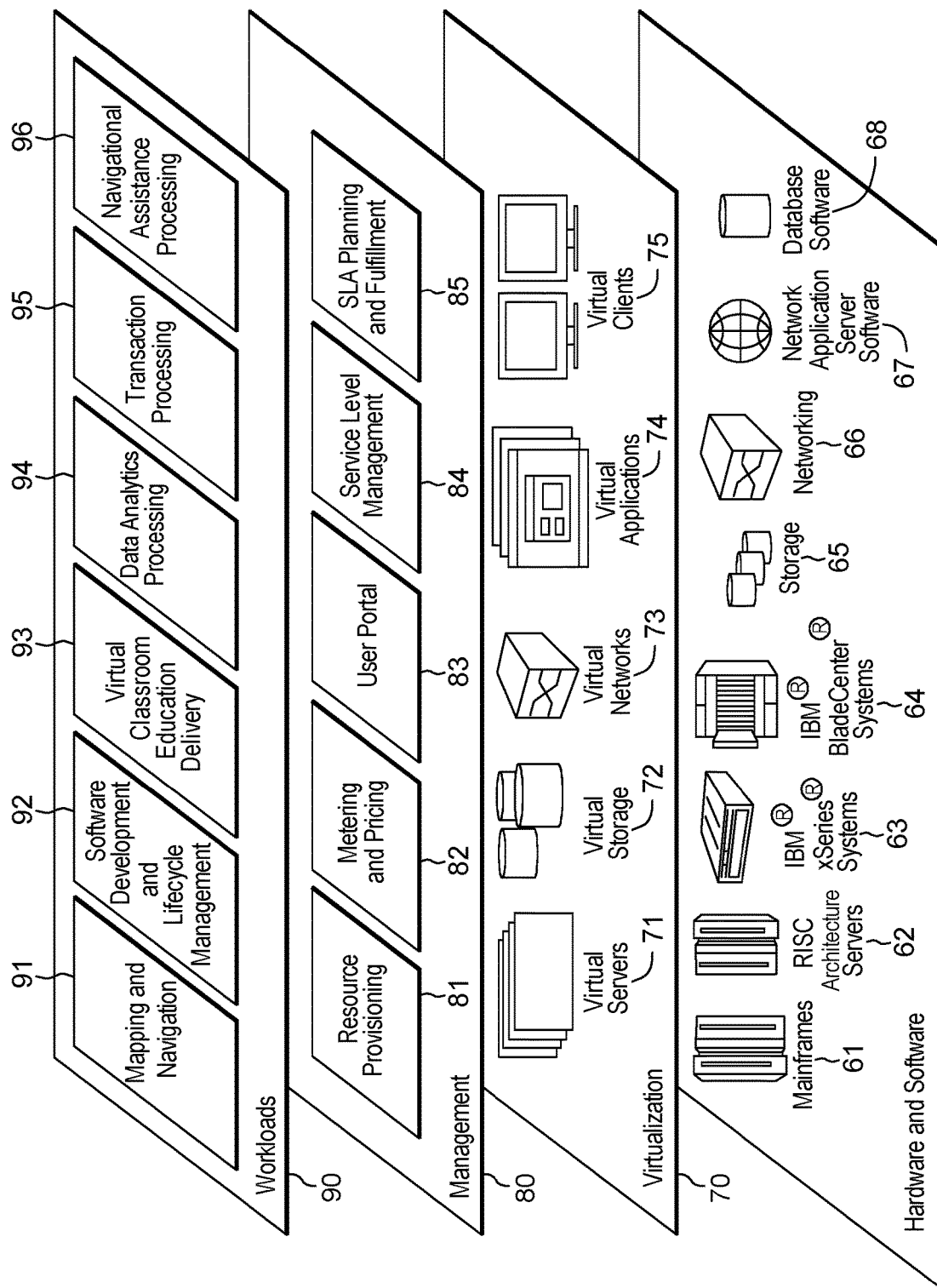
FIG. 9 depicts an example of extraction model layers, which may facilitate implementing navigational assistance processing, in accordance with one or more aspects of the present invention.

Referring to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and navigational assistance processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of providing auxiliary navigational assistance, the method comprising:
    determining, by one or more processors, that a user traveling along a specified travel route with the assistance of a navigation system can use additional navigational assistance at a particular region of the specified travel route;
    based on the determining, assigning by the one or more processors, a first unmanned vehicle to assist the user in traveling through the particular region along the specified travel route;
    providing, by the one or more processors, one or more auxiliary instructions to the user's navigation system directing the user to reference the first unmanned vehicle within the particular region to assist the user in traveling through the particular region along the specified travel route, wherein the particular region overlaps only a portion of the specified travel route;

detecting that the first unmanned vehicle becomes inoperable, and unable to continue to assist the user in traveling through the particular region;

based on the detecting, assigning by the one or more processors, a second unmanned vehicle to assist the user in traveling through an additional part of the particular region along the specified travel route, the second unmanned vehicle replacing the first unmanned vehicle in assisting the user within the particular region; and based on the assigning of the second unmanned vehicle to assist the user, providing by the one or more processors, one or more further auxiliary instructions to the user's navigation system directing the user to now reference the second unmanned vehicle within the particular region to assist the user in traveling through the additional part of the particular region along the specified travel route.

2. The method of claim 1, wherein the determining, by the one or more processors, is without the user requesting the auxiliary navigational assistance.

3. The method of claim 2, wherein the determining, by the one or more processors, is based, at least in part, on historical travel data associated with the particular region.

4. The method of claim 2, wherein the determining, by the one or more processors, is based, at least in part, on the one or more processors detecting one or more current adverse travel conditions within the particular region.

5. The method of claim 2, wherein the determining, by the one or more processors, is based, at least in part, on monitoring the user within the particular region.

6. The method of claim 1, wherein the determining comprises receiving, by the one or more processors, a request from the user for auxiliary navigational assistance within the particular region of the specified travel route.

7. The method of claim 1, wherein the providing, by the one or more processors, the one or more auxiliary instructions directs the navigation system to modify the navigation system's navigational instructions to the user to incorporate reference to the unmanned vehicle within the particular region.

8. The method of claim 7, wherein the providing, by the one or more processors, the one or more auxiliary instructions to the user's navigation system dynamically modifies, at least in part, a series of pre-established navigation instructions for the user traveling along the specified travel route.

9. The method of claim 7, wherein the providing, by the one or more processors, the one or more auxiliary instructions to the user's navigation system directs the user to follow the unmanned vehicle within the particular region.

10. The method of claim 1, further comprising terminating, by the one or more processors, providing auxiliary navigational assistance to the user via the unmanned vehicle once the user passes through the particular region of the specified travel route.

11. A system for providing auxiliary navigational assistance, the system comprising:
a memory; and
a processing circuit communicatively coupled to the memory, wherein the system performs a method comprising:
determining that a user traveling along a specified travel route with the assistance of a navigation system can use additional navigational assistance at a particular region of the specified travel route;
based on the determining, assigning a first unmanned vehicle to assist the user in traveling through the particular region along the specified travel route;
providing one or more auxiliary instructions to the user's navigation system directing the user to reference the first unmanned vehicle within the particular region to assist the user in traveling through the particular region along the specified travel route, wherein the particular region overlaps only a portion of the specified travel route;
detecting that the first unmanned vehicle becomes inoperable, and unable to continue to assist the user in traveling through the particular region;
based on the detecting, assigning by the one or more processors, a second unmanned vehicle to assist the user in traveling through an additional part of the particular region along the specified travel route, the second unmanned vehicle replacing the first unmanned vehicle in assisting the user within the particular region; and
based on the assigning of the second unmanned vehicle to assist the user, providing by the one or more processors, one or more further auxiliary instructions to the user's navigation system directing the user to now reference the second unmanned vehicle within the particular region to assist the user in traveling through the additional part of the particular region along the specified travel route.

12. The system of claim 11, wherein the determining, by the one or more processors, is without the user requesting the auxiliary navigational assistance.

13. The system of claim 12, wherein the determining, by the one or more processors, is based, at least in part, on historical travel data associated with the particular region.

14. The system of claim 12, wherein the determining, by the one or more processors, is based, at least in part, on the one or more processors detecting one or more current adverse travel conditions within the particular region.

15. The system of claim 12, wherein the determining, by the one or more processors, is based, at least in part, on monitoring the user within the particular region.

16. The system of claim 11, wherein the providing, by the one or more processors, the one or more auxiliary instructions directs the navigation system to modify the navigation system's navigational instructions to the user to incorporate reference to the unmanned vehicle within the particular region.

17. A computer program product for facilitating providing auxiliary navigational assistance, the computer program product comprising:
a computer readable storage medium having computer readable program code embodied therewith, the computer readable program code being executable by a processor to perform a method comprising:
determining that a user traveling along a specified travel route with the assistance of a navigation system can use additional navigational assistance at a particular region of the specified travel route;
based on the determining, assigning a first unmanned vehicle to assist the user in traveling through the particular region along the specified travel route;
providing one or more auxiliary instructions to the user's navigation system directing the user to reference the first unmanned vehicle within the particular region to assist the user in traveling through the particular region along the specified travel route, wherein the particular region overlaps only a portion of the specified travel route;

detecting that the first unmanned vehicle becomes inoperable, and unable to continue to assist the user in traveling through the particular region;

based on the detecting, assigning by the one or more processors, a second unmanned vehicle to assist the user in traveling through an additional part of the particular region along the specified travel route, the second unmanned vehicle replacing the first unmanned vehicle in assisting the user within the particular region; and based on the assigning of the second unmanned vehicle to assist the user, providing by the one or more processors, one or more further auxiliary instructions to the user's navigation system directing the user to now reference the second unmanned vehicle within the particular region to assist the user in traveling through the additional part of the particular region along the specified travel route.

18. The computer program product of claim 17, wherein the determining, by the one or more processors, is without the user requesting the auxiliary navigational assistance.

19. The computer program product of claim 17, wherein the providing, by the one or more processors, the one or more auxiliary instructions directs the navigation system to modify the navigation system's navigational instructions to the user to incorporate reference to the unmanned vehicle within the particular region.

20. The computer program product of claim 19, wherein the providing, by the one or more processors, the one or more auxiliary instructions to the user's navigation system dynamically modifies, at least in part, a series of pre-established navigation instructions for the user traveling along the specified travel route.

* * * * *